(12) United States Patent
Chaumet

(10) Patent No.: US 8,910,521 B2
(45) Date of Patent: *Dec. 16, 2014

(54) VIBRATING STRUCTURE GYROMETER WITH AT LEAST ONE TUNING FORK

(75) Inventor: Bernard Chaumet, Chatellerault (FR)

(73) Assignee: Thales, Neuilly-sur_Seine (FR)

( * ) Notice: Subject to any disclaimer, the term of this patent is extended or adjusted under 35 U.S.C. 154(b) by 321 days.

This patent is subject to a terminal disclaimer.

(21) Appl. No.: 13/510,584

(22) PCT Filed: Sep. 27, 2010

(86) PCT No.: PCT/EP2010/064248
§ 371 (c)(1),
(2), (4) Date: Jun. 21, 2012

(87) PCT Pub. No.: WO2011/064016
PCT Pub. Date: Jun. 3, 2011

(65) Prior Publication Data
US 2013/0042683 A1 Feb. 21, 2013

(30) Foreign Application Priority Data
Nov. 24, 2009 (FR) ...................................... 09 05638

(51) Int. Cl.
*G01C 19/56* (2012.01)
*G01C 19/574* (2012.01)
*G01C 19/5621* (2012.01)

(52) U.S. Cl.
CPC .......... *G01C 19/574* (2013.01); *G01C 19/5621* (2013.01)
USPC ...................................................... 73/504.16

(58) Field of Classification Search
USPC ........................................ 73/504.12, 504.16
See application file for complete search history.

(56) References Cited

U.S. PATENT DOCUMENTS 7,159,460 B2 * 1/2007 Nicu et al. ................. 73/504.12
7,159,461 B2 * 1/2007 Gallon et al. .............. 73/504.12
(Continued)

OTHER PUBLICATIONS

Office Europeen Des Brevets; International Search Report; Nov. 4, 2010; NL-2280 HV Rijswijk.

*Primary Examiner* — Hezron E Williams
*Assistant Examiner* — Xin Zhong
(74) *Attorney, Agent, or Firm* — Michael J. Donohue; Davis Wright Tremaine LLP

(57) ABSTRACT

Vibrating structure gyrometer with at least one tuning fork, produced by micro-machining from a thin plate, the said tuning fork comprising a pair of mobile inertial assemblies (EIM1, EIM2) linked by a coupling assembly (1). A tuning fork comprises two controlled electrodes (9, 9') for electrostatic equilibration of the sense resonator along the sense axis y which are respectively associated with the two mobile inertial assemblies (EIM1, EIM2) of the said tuning fork, and control means (UCE) adapted for applying two respective continuous electrical voltages $V_1$ and $V_2$ to the said two electrodes (9, 9') satisfying the relation $$V_1^2 - V_2^2 = \frac{c_{y\_initial}}{a\lambda},$$

in which $c_{y\_initial}$ represents the initial sensitivity of the gyrometer, when the two electrical voltages $V_1$ and $V_2$ are zero, to linear accelerations along the sense axis y, in $\deg \cdot h^{-1} \cdot G^{-1}$, a represents a coefficient characterizing the influence of a discrepancy in stiffness between the two branches of the tuning fork on the sensitivity of the gyrometer to linear accelerations along the y axis, in $\deg \cdot h^{-1} \cdot G^{-1} \cdot N^{-1} \cdot m$, $\lambda$ represents an electrostatic stiffness coefficient dependent on the said two electrodes (9, 9') in $N \cdot m^{-1} \cdot V^{-2}$, $V_1$ and $V_2$ are expressed in Volts, and G equals $9.81 \text{ m} \cdot s^{-2}$.

5 Claims, 2 Drawing Sheets

(56) References Cited

U.S. PATENT DOCUMENTS

| | | | |
|---|---|---|---|
| 7,313,958 B2 * | 1/2008 | Willig et al. | 73/504.12 |
| 8,104,364 B2 * | 1/2012 | Chaumet | 74/5.46 |
| 2004/0123660 A1 | 7/2004 | Willig | |
| 2006/0037396 A1 | 2/2006 | Rougeot et al. | |
| 2008/0282833 A1 | 11/2008 | Chaumet | |
| 2012/0260737 A1 * | 10/2012 | Chaumet | 73/658 |

* cited by examiner

VIBRATING STRUCTURE GYROMETER WITH AT LEAST ONE TUNING FORK

The invention pertains to a vibrating structure gyrometer with at least one tuning fork, produced by micro-machining from a thin plate.

Figure 1:
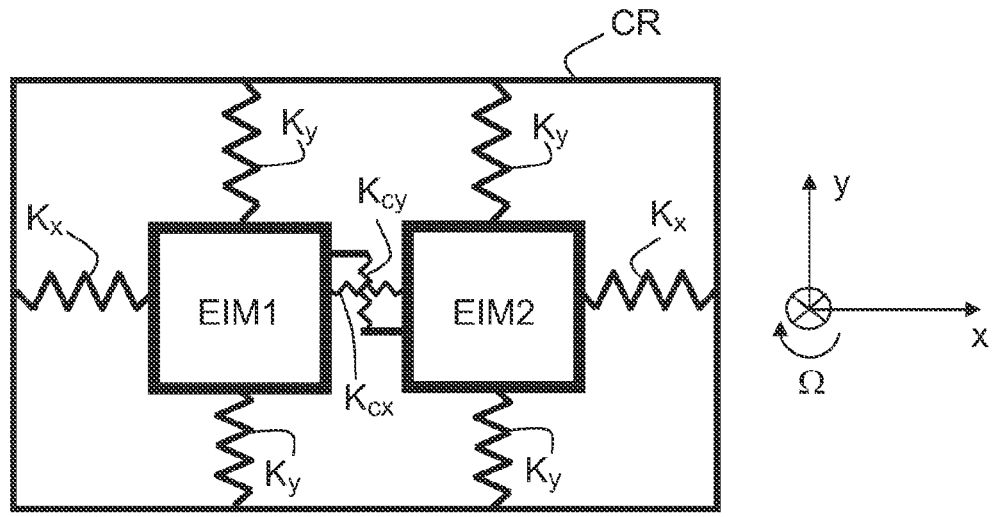

Tuning fork gyrometers are known, as illustrated in FIG. 1. Two mobile inertial assemblies EIM1 and EIM2 form a tuning fork, are suspended on a rigid framework CR, and possess two degrees of freedom along the x and y axes respectively dubbed the drive axis and the sense axis. The mobile inertial assemblies EIM1, EIM2 are linked to the rigid framework CR by stiffness elements Kx1 and Kx2 in the drive direction x and by stiffness elements Ky1 and Ky2 in the direction of sense y. Each mobile inertial assembly EIM1, EIM2 comprises one or more masses.

The two mobile inertial assemblies EIM1 and EIM2 are mechanically coupled together by a coupling assembly of stiffness $k_{cx}$ in the drive direction x and of stiffness $k_{cy}$ in the sense direction y. Such a gyrometer is, for example, described in document WO2004/042324 (THALES).

Such a gyrometer exhibits 2 useful modes of vibration:
a mode of frequency fx in which the two mobile inertial assemblies EIM1 and EIM2 vibrate in phase opposition along the drive axis x; this mode is dubbed the drive mode; and
a mode of frequency fy in which the two mobile inertial assemblies EIM1 and EIM2 vibrate in phase opposition along the sense axis y; this mode is dubbed the sense mode.

Figure 2:
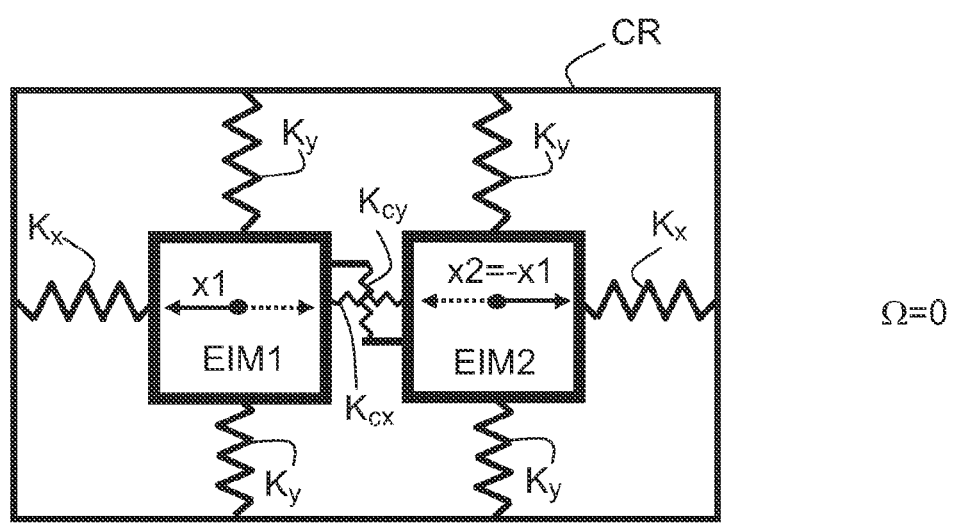

As illustrated in FIG. 2, the two mobile inertial assemblies EIM1 and EIM2 are excited on the drive mode of resonance, according to which mode they vibrate in phase opposition in the direction of the x axis. A slaving loop, not represented in the figure, makes it possible to maintain the drive frequency at the resonant frequency $f_x$ of the drive mode as well as to keep the amplitude of this motion constant.

Figure 3:
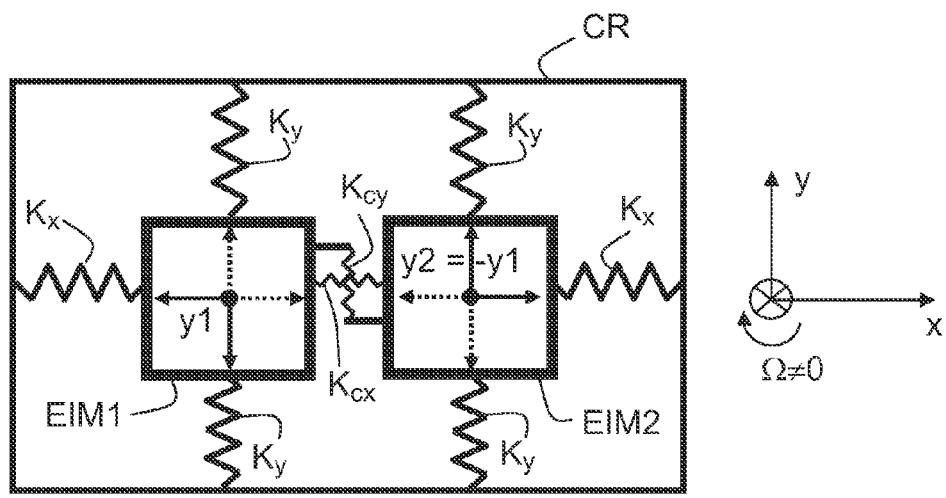

In the presence of a rotation speed Ω, directed along a third axis z such that the reference system (y, x, z) is right-handed, the Coriolis forces cause a coupling between the drive resonator and the sense resonator bringing about a vibratory motion of each of the two mobile inertial assemblies EIM1 and EIM2 along the sense axis y, as illustrated in FIG. 3. Each mobile inertial assembly EIM1, EIM2 comprises several masses, for example two, one involved in the drive resonator, but both involved in the sense resonator. Stated otherwise, in a simplified manner, the sense resonator comprises the two mobile inertial assemblies EIM1, EIM2 and the elements with stiffnesses along the sense axis y, and the drive resonator comprises the two mobile inertial assemblies EIM1, EIM2 and the elements with stiffnesses along the drive axis x.

The motions of the two mobile inertial assemblies EIM1 and EIM2 along the sense axis y are in phase opposition and the useful motion may be defined by the half-difference of the sense motions $y_1$ and $y_2$ of each mobile inertial assembly. This motion is henceforth dubbed the differential sense motion $y_{diff}$. It may be defined by $$y_{diff} = \frac{y_1 - y_2}{2}.$$

This motion is also of resonant frequency $f_x$ along the drive axis x. The amplitude of this differential sense motion is proportional to the rotation speed.

For tuning fork gyrometers operating in open loop, the amplitude of the sense motion $y_{diff}$ is measured directly so as to obtain rotation speed information.

For gyrometers operating in closed loop, the differential sense motion $y_{diff}$ is slaved to zero by electrostatic force balance along the sense axis y. The gyrometer output information is then given by the differential feedback voltage necessary for the cancellation of the displacement. The conventional scheme for such slaving is, for example, illustrated and described in European patent EP 1 579 176 B1 (THALES).

It is well known to the person skilled in the art that the imperfections in production of a gyrometer lead to errors in the information delivered as output by the gyrometer. Most of these imperfections must be compensated by equilibrating the gyrometer.

It is known to carry out this compensation by removing material locally, for example by laser ablation, so as to modify the distribution of mass or of stiffness. This process is generally expensive to implement on a gyrometer micro-machined from a thin silicon plate, whose sense and drive motions lie in the plane of the substrate.

On gyrometers micro-machined from silicon, the compensation may be carried out in an electrical manner, on the basis of electrostatic forces controllable by controlled electrical voltages. Such gyrometers generally employ electrostatic means, notably controlled electrodes, capable of compensating two types of defects:
the mechanical coupling between the drive mode and the sense mode, from which the so-called quadrature bias originates, and
the discrepancy in frequencies between drive mode and sense mode.

An exemplary embodiment for compensating for the quadrature bias of a planar micro-machined vibrating gyrometer whose drive and sense motions are linear and situated in the plane of the substrate is described in patent application WO 2007/068649 (THALES).

However, such compensations do not make it possible to compensate for the effects of the mass and stiffness asymmetries between the two branches of the tuning fork.

In fact, a tuning fork gyrometer whose two branches are asymmetric is sensitive to linear accelerations.

Indeed if the branches of the tuning fork are perfectly symmetric, the motions of each mobile inertial assembly of a branch of the tuning fork caused by linear accelerations remain perfectly symmetric. On account of the differential architecture of the tuning fork gyrometer, this motion has no detectable effect and therefore cannot disturb the gyrometer output signal.

On the other hand, in the presence of asymmetries of mass or of stiffness between the two mobile inertial assemblies of the branches of the tuning fork, the linear accelerations along the sense axis y then cause non-symmetric motions along the sense axis y of the two mobile inertial assemblies. The effect of these asymmetric motions is then detectable and provokes a disturbance of the gyrometer output signal.

This disturbance may be manifested as a sensitivity of the output of the gyrometer to static accelerations or to dynamic accelerations along the sense axis y.

The information S delivered as output by the gyrometer, expressed in degrees/hour (deg/h or °/h), may be put into the form of the following relation:

$$S = S_O + c_y \gamma_y$$

in which:
$S_O$ represents the gyrometer output signal in the absence of acceleration, in deg·h$^{-1}$,
$\gamma_y$ represents a static or dynamic linear acceleration along the sense axis y, in G, G being equal to 9.81 m·s$^{-2}$,
$c_y$ represents the sensitivity of the output S to the acceleration $\gamma_y$, in deg·h$^{-1}$·G$^{-1}$, and $$c_y = a \delta k_y + b \delta m_y,$$

a being a sensitivity coefficient, in deg·h$^{-1}$·G$^{-1}$·N$^{-1}$·m that may possibly vary as a function of the frequency of the acceleration, b being a sensitivity coefficient, in deg·h$^{-1}$·G$^{-1}$·kg$^{-1}$ that may possibly vary as a function of the frequency of the acceleration, δm=m1−m2 representing the discrepancy of masses between the two branches of the tuning fork, in kg, and δ=k1−k2 representing the discrepancy of stiffnesses between the two branches of the tuning fork, in N·m$^{-1}$.

The reduction in the sensitivity to vibrations or to linear accelerations along the sense axis y may be obtained by equilibration of the two branches of the tuning fork.

On certain gyrometers with metallic or quartz tuning fork, this equilibration is produced through local material ablation consisting in creating an asymmetry of mass or of stiffness that is opposite to the initial asymmetries of the tuning fork. This process is generally expensive and difficult to implement on silicon micro-machined gyrometers of small size.

It is also possible to use controlled electrostatic forces making it possible to create an asymmetry in electrostatic stiffness that is controlled by an electrical signal which opposes the initial asymmetries. Such processes are applied to gyrometers with vibrating shells or vibrating annulus.

An aim of the invention is to compensate for the asymmetries in masses or in stiffness of the sense resonator or tuning fork of a silicon tuning fork gyrometer, at reduced cost, and with improved precision.

According to one aspect of the invention, there is proposed a vibrating structure gyrometer with at least one tuning fork, produced by micro-machining from a thin plate, the said tuning fork comprising a pair of mobile inertial assemblies linked by a coupling assembly, one mobile inertial assembly being furnished with first stiffness elements essentially deformable in the plane of the plate along an drive axis x and with second stiffness elements essentially deformable in the plane of the plate along a sense axis y substantially perpendicular to the x axis. The gyrometer comprises, furthermore, for the tuning fork, two first controlled electrodes for electrostatic excitation along the drive axis x which are respectively associated with the two mobile inertial assemblies, two second controlled electrodes for capacitive detection of the drive motion along the drive axis x which are respectively associated with the two mobile inertial assemblies, and two third controlled electrodes for capacitive detection of the drive motion along the sense axis y which are respectively associated with the two mobile inertial assemblies. When the sense motion is slaved by electrostatic force balance, the gyrometer comprises two controlled electrodes making it possible to apply the electrostatic feedback force necessary for the slaving of the sense motion.

The gyrometer also comprises:

two fourth controlled electrodes for electrostatic equilibration of the sense resonator along the sense axis y which are respectively associated with the two mobile inertial assemblies of the said tuning fork, and control means adapted for applying two respective continuous electrical voltages $V_1$ and $V_2$ to the said two fourth electrodes satisfying the relation $$V_1^2 - V_2^2 = \frac{c_{y\_initial}}{a\lambda},$$

in which $c_{y\_initial}$ represents the initial sensitivity of the gyrometer, when the two electrical voltages $V_1$ and $V_2$ are zero, to linear accelerations along the sense axis y, in deg·h$^{-1}$·G$^{-1}$, a represents a coefficient characterizing the influence of a discrepancy in stiffness between the two branches of the tuning fork on the sensitivity of the gyrometer to linear accelerations along the y axis, in deg·h$^{-1}$·G$^{-1}$·N$^{-1}$·m, λ represents an electrostatic stiffness coefficient dependent on the said two fourth electrodes in N·m$^{-1}$·V$^{-2}$, $V_1$ and $V_2$ are expressed in Volts, and G equals 9.81 m·s$^{-2}$.

Such a gyrometer is thus, at reduced cost, compensated, in such a way as to greatly limit, or indeed cancel, the asymmetries of masses or of stiffness of the tuning fork or tuning forks.

According to one embodiment, the gyrometer comprises, furthermore, two fifth controlled electrodes for electrostatic adjustment of the frequency of the sense motion along the sense axis y, respective of the two mobile inertial assemblies of the said tuning fork, and the said control means are adapted for applying an electrical voltage $V_f$ to each of the said fifth electrodes, satisfying the relation $$V_f^2 = \frac{(f_{y\_initial} - f_{y\_final}) - \mu(V_1^2 + V_2^2)}{\mu_f},$$

in which:

$f_{y\_initial}$ represents the initial resonant frequency, when the electrical voltages $V_1$, $V_2$ and $V_f$ are zero, of the sense mode along the sense axis y, in Hz, $f_{y\_final}$ represents the desired, final resonant frequency of the sense mode along the sense axis y, to be adjusted, in Hz, μ represents a sensitivity coefficient dependent on the said fourth electrodes, in Hz·V$^{-2}$, $μ_f$ represents a coefficient of sensitivity of the frequency of the sense mode to the square of the electrical voltage applied to the said fifth electrodes, in Hz·V$^{-2}$, $V_f$ is expressed in Volts, and $(f_{y\_initial}-f_{y\_final})-\mu(V_1^2+V_2^2)$ is positive by dimensioning of the gyrometer.

The precision is thus further improved, since the adjustment of the discrepancy in frequencies between the sense mode and the drive mode allows better control of the gyrometric coupling between the sense mode and the drive mode and thus makes it possible to circumvent the spread caused by certain manufacturing defects in this coupling.

The sense motion of the sense resonator may be cancelled by slaving by electrostatic balance of forces, the said final resonant frequency $f_{y\_final}$ is then equal to the frequency $f_x$ of the drive mode along the drive axis x, and the equalization of the two frequencies may be achieved either by using a feedback loop to control the said fifth electrodes, or by open-loop control of the said fifth electrodes.

In another embodiment, in which the sense motion of the sense resonator is in open loop, the said final resonant frequency $f_{y\_final}$ is equal to the sum of the frequency fx of the mode of the drive mode along the drive axis x and of a predetermined frequency discrepancy $\Delta f_y$.

Figure 4:
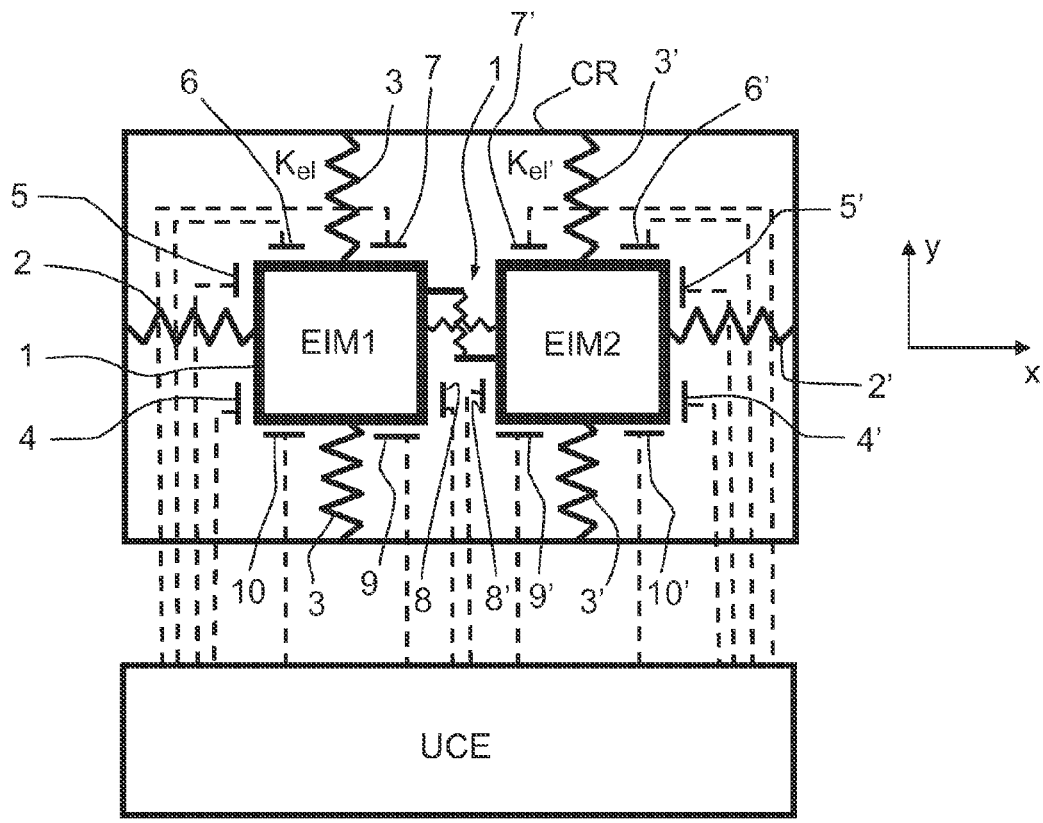

The invention will be better understood on studying a few embodiments described by way of wholly non-limiting examples and illustrated by the appended drawings in which:

FIGS. 1, 2 and 3 schematically illustrate a tuning fork gyrometer and its operation, of the prior art; and FIG. 4 illustrates an embodiment of a vibrating structure gyrometer with at least one tuning fork, produced by micro-machining from a thin plate, according to one aspect of the invention.

In the various figures, elements having identical references are similar.

In FIG. 4 is schematically represented a vibrating structure gyrometer with tuning fork, produced by micro-machining from a thin plate.

Of course, the invention also applies to a vibrating structure gyrometer, produced by micro-machining from a thin plate, comprising an arbitrary number of tuning forks.

Two mobile inertial assemblies EIM1 and EIM2 linked by a coupling assembly 1 form a tuning fork, and are suspended on a rigid framework CR. The two mobile inertial assemblies EIM1 and EIM2 possess two degrees of freedom along the axes x and y respectively dubbed the drive axis and the sense axis. The drive axe x and the sense axis y are substantially orthogonal.

A mobile inertial assembly is, for example, such as described in patent application WO2004/042324 (THALES).

Each mobile inertial assembly EIM1, EIM2 is respectively furnished with first stiffness elements 2, 2' essentially deformable in the plane of the plate along the drive axis x. Furthermore, each mobile inertial assembly EIM1, EIM2 is respectively furnished with second stiffness elements 3, 3' essentially deformable in the plane of the plate along the sense axis y.

In a conventional manner, the gyrometer comprises an electronic control unit UCE, and two first controlled electrodes 4, 4' for electrostatic excitation along the drive axis x which are respectively associated with the two mobile inertial assemblies EIM1, EIM2.

Two second controlled electrodes 5, 5' for capacitive detection of the drive motion along the drive axis x are respectively associated with the two mobile inertial assemblies EIM1, EIM2.

Moreover, two third controlled electrodes 6, 6' for capacitive detection of the drive motion along the sense axis y are respectively associated with the two mobile inertial assemblies EIM1, EIM2.

When the sense motion is slaved by electrostatic force balance, the gyrometer comprises two electrodes 7 and 7' associated with the two mobile assemblies EIM1 and EIM2 and making it possible to apply the electrostatic feedback force necessary for the slaving of the sense motion.

Two controlled optional extra electrodes 8, 8' can serve to compensate the quadrature bias.

The gyrometer also comprises two fourth controlled electrodes 9, 9' for electrostatic equilibration of the sense resonator along the sense axis y which are respectively associated with the two mobile inertial assemblies EIM1, EIM2, as well as two fifth optional controlled electrodes 10, 10' for electrostatic adjustment of the frequency of the sense motion along the sense axis y which are respectively associated with the two mobile inertial assemblies EIM1, EIM2.

An electronic control unit UCE manages the operation of the gyrometer.

The electronic control unit UCE is adapted for applying two respective continuous electrical voltages $V_1$ and $V_2$ to the two fourth electrodes 9, 9', satisfying the following relation:

$$V_1^2 - V_2^2 = \frac{c_{y\_initial}}{a\lambda},$$

in which $c_{y\_initial}$ represents the initial sensitivity of the output S of the gyrometer, when the electrical voltages $V_1$ and $V_2$ are zero, to linear accelerations $\gamma_y$, along the sense axis y, in deg·h$^{-1}$·G$^{-1}$, a represents a coefficient characterizing the influence of a discrepancy in stiffness between the two branches of the tuning fork on the sensitivity of the gyrometer to linear accelerations along the y axis, in deg·h$^{-1}$·G$^{-1}$·N$^{-1}$·m, $\lambda$ represents a coefficient of sensitivity of the electrostatic stiffness along the sense axis y to the square of the electrical voltage applied to the fourth electrodes, dependent on the said two fourth electrodes in N·m$^{-1}$·V$^{-2}$, $V_1$ and $V_2$ are expressed in Volts, and G equals 9.81 m·s$^{-2}$.

Indeed, by applying electrical voltages $V_1$ and $V_2$ to each of the two fourth equilibration electrodes 9 and 9', negative electrostatic stiffnesses $k_{el}$ and $k_{el}'$, in N·m$^{-1}$, along the sense axis y, are created on each of the two branches EIM1 and EIM2 of the tuning fork:

$$k_{el} = -\lambda V_1^2, \text{ and}$$

$$k_{el}' = -\lambda V_2^2$$

$\lambda$ representing a coefficient which characterizes the proportionality between the electrostatic stiffness and the square of the electrical voltage applied to the fourth electrodes 9, 9', in N·m$^{-1}$·V$^{-2}$.

The effect of these variations in stiffnesses is to create a discrepancy in stiffnesses $\Delta k$ between the two branches EIM1 and EIM2 of the tuning fork, in proportion to the difference of the squares of the electrical voltages $V_1$ and $V_2$ applied, $\Delta k$ satisfying the following relation:

$$\Delta k = -\lambda(V_1^2 - V_2^2)$$

This stiffness discrepancy $\Delta k$ makes it possible to create a sensitivity $S_{el}$ of the gyrometer to linear accelerations along the sense axis y, satisfying the relation $S_{el} = a\Delta k_{el}\gamma_y$, and that can be subtracted from the initial output S equal to $S_0 + c_{y\_initial}\gamma_y$.

Thus, an output S satisfying the following relation is obtained:

$$S = S_0 + c_{y\_initial}\gamma_y - a\lambda(V_1^2 - V_2^2)\gamma_y$$

The sensitivity of the output S to acceleration along the sense axis can thus be cancelled by adjusting the voltages $V_1$ and $V_2$ in such a way that the following condition is fulfilled:

$$V_1^2 - V_2^2 = \frac{c_{y\_initial}}{a\lambda} \qquad \text{(equation 1)}$$

The term $c_{y\_initial}$ which represents the initial sensitivity of the gyrometer to acceleration may be measured for example during the calibration of the gyrometer.

The effect of the electrostatic stiffnesses $k_{el}$ and $k_{el}'$ created by the electrical voltages $V_1$ and $V_2$ is also to decrease by $\Delta f_y$ the resonant frequency $f_y$ of the sense mode in proportion to the sum of the squares of the electrical voltages applied by the electronic control unit UCE to the fourth electrodes 9, 9', with: $\Delta f_y = (V_1^2 + V_2^2)$.

If $f_{y\_initial}$ denotes the resonant frequency of the sense mode in the absence of the electrical voltages $V_1$ and $V_2$, this resonant frequency takes the value $f_y' = f_{y\_initial} - \Delta f_y = f_{y\_initial} - \mu(V_1^2 + V_2'^2)$ when the electronic control unit UCE applies these electrical voltages $V_1$ and $V_2$. The coefficient $\mu$ depends on the coefficient $\lambda$ and on the mass and stiffness characteristics of the tuning fork in the direction of the sense axis y.

The electronic control unit UCE can then control the two fifth optional controlled electrodes 10, 10' for electrostatic adjustment of the frequency of the sense resonator along the sense axis y, so as to adjust the resonant frequency of the sense mode to a final value $f_{y\_final}$.

In the case of closed-loop operation, the final value $f_{y\_final}$ is generally equal to the frequency $f_x$ of the drive mode ($f_{y\_final}=f_x$) and, in the case of open-loop operation, it is not generally sought to equalize the frequencies of the sense and drive modes, but to obtain a precise frequency discrepancy $\Delta f_y = f_y - f_x$ ($f_{y\_initial} = f_x + \Delta f_y$).

To obtain the final value $f_{y\_final}$, an identical electrical voltage $V_f$ is applied to each of the two fifth optional controlled electrodes 10, 10' for electrostatic adjustment of the frequency of the sense resonator along the sense axis y.

The effect of this is to create a negative electrostatic stiffness $k_f$ on each of the two branches EIM1, EIM2 of the tuning fork satisfying the following relation:

$$k_f = -\lambda_f V_f^2$$

In the presence of the voltage $V_f$, the resonant frequency $f_y$ of the sense mode then becomes:

$$f_y = f_y' - \mu_f V_f^2$$

$f_y'$ being the value of $f_y$ in the absence of application of the electrical voltage $V_f$, i.e. when $V_f$ is zero.

The coefficient $\lambda_f$ represents a coefficient which characterizes the proportionality between the electrostatic stiffness and the square of the electrical voltage applied to the fifth electrodes 10, 10', in $N \cdot m^{-1} \cdot V^{-2}$ The coefficient $\mu_f$ depends on the coefficient $\lambda_f$, and on the mass and stiffness characteristics of the tuning fork along the sense axis y and of the fifth electrodes.

It is then necessary to adjust $V_f$ so that $f_y$ attains the final value $f_{y\_final}$:

Hence, we have $f_{y\_final} = f_{y\_initial} - \mu(V_1^2 + V_2^2) - \mu_f V_f^2$ i.e.

$$V_f^2 = \frac{(f_{y\_initial} - f_{y\_final}) - \mu(V_1^2 + V_2^2)}{\mu_f} \quad \text{(equation 2)}$$

In order that the trim or frequency adjustment may be possible, the term $(f_{y\_initial} - f_{y\_final}) - \mu(V_1^2 + V_2^2)$ must always be positive. This is obtained by dimensioning the gyrometer in a way which guarantees that the discrepancy $(f_{y\_initial} - f_{y\_final})$ is large enough for the term $(f_{y\_final} - f_{y\_initial}) - \mu(V_1^2 + V_2^2)$ to always remain positive, despite manufacturing spread.

An example follows.

The initial value of the sense frequency is $f_{y\_initial} = 10300$ Hz and the target final value is $f_{y\_final} = 10000$ Hz The initial sensitivity to acceleration is $c_{y\_initial} = 20°/h/g$.

The coefficients have the following values:
$a\lambda \approx 0.5°/h/g/V^2$
$\mu_f \approx 1\ Hz \cdot V^{-2}$
$\mu \approx 0.5\ Hz \cdot V^{-2}$ To cancel this initial sensitivity the difference of the squares of the electrical voltages $V_1$ and $V_2$ applied to the equilibration electrodes must be such that:

$$(V_1^2 - V_2^2) = \frac{s_{y\_initial}}{a\lambda} = \frac{20}{0.5} = 40\ \text{Volts}^2$$

To attain the frequency value $f_{y\_final} = 10000$ Hz, the voltage $V_f$ applied to the fifth controlled electrodes 10, 10' for electrostatic adjustment of the frequency of the sense resonator along the sense axis y must then be such that:

$$V_f^2 = \frac{(f_{y\_initial} - f_{y\_final}) - \mu(V_1^2 + V_2^2)}{\mu_f} = 300 - 0.5(V_1^2 + V_2^2)$$

It is for example possible to choose to apply a zero voltage $V_2$ to one of the two fourth controlled electrodes 9, 9' for electrostatic equilibration of the sense motion along the sense axis y.

The voltage $V_1$ of the other fourth electrode is then:

$$V_1 = \sqrt{40} = 6.34\ \text{Volts}$$

and the electrical voltage $V_f$ making it possible to attain the value $f_{y\_final}$ is then:

$$V_f = \sqrt{300 - 0.5 \cdot 40} = 16.73\ \text{Volts}$$

The information S delivered as output by the gyrometer, expressed in degrees/hour (deg/h or °/h), may be put into the form of the following relation:

$$S = S_O + c_y \gamma_y$$

The invention is based on the fact that the sensitivity term $c_y$ evolves linearly as a function of the difference of the squares of the voltages $V_1$ and $V_2$ applied to each of the fourth electrodes. It is therefore possible to cancel this term by applying an appropriate value of $V_1^2 - V_2^2$ to these electrodes.

This dependency of $c_y$ on $V_1^2 - V_2^2$ may be demonstrated in a theoretical manner on the basis of the following two elements:

the coefficient $c_y$ depends linearly on the asymmetries of stiffness and of mass $\delta m = m1 - m2$ and $\delta k = k1 - k2$ of the tuning fork. It is therefore possible to put the coefficient $c_y$ into the following form $c_y = a\delta k + b\delta m$ Moreover, an electrostatic stiffness asymmetry $\delta k_{yel}$ can be created artificially by applying two DC voltages $V_1$ and $V_2$ to the two fourth electrodes. This stiffness is proportional to the difference of the squares of the voltages applied and can therefore be written in the form: $\delta k_{yel} = \lambda(V_2^2 - V_1^2)$ Thus by applying a voltage $V_1$ and $V_2$, the sensitivity term $c_y$ is modified in the following manner: $c_y = a(\delta k + \delta k_{yel}) + b\delta m$ Or else: $c_y = a(\delta k + \lambda(V_2^2 - V_1^2)) + b\delta m$ All these elements mentioned previously make it possible to bolster the fact that the sensitivity to acceleration term $c_y$ evolves linearly as a function of the square of the voltages $V_1$ and $V_2$ applied to each of the fourth electrodes.

But to determine what value of $V_1^2 - V_2^2$ cancels the sensitivity term $c_y$, it is wholly unnecessary to determine the coefficients a, b, $\lambda$ separately.

We proceed in the following manner:

For a value of $V_1^2 - V_2^2$ equal to zero, the value of the sensitivity coefficient c is determined experimentally. Accordingly, the sensor is subjected to several acceleration levels, and the sensor output S is measured for each level. The slope of the evolution of S as a function of the level of acceleration gives the value of the coefficient $c_y$.

The measurement of $c_y$ is repeated for nonzero values of $V_1^2 - V_2^2$ (for example for two other values).

This therefore yields a curve of the evolution of $c_y$ as a function of $V_1^2 - V_2^2$. The value of $V_1^2 - V_2^2$ which cancels the sensitivity to acceleration can then be determined precisely by interpolation or by extrapolation.

The invention claimed is:

1. Vibrating structure gyrometer with at least one tuning fork, produced by micro-machining from a thin plate, the said tuning fork comprising a pair of mobile inertial assemblies (EIM1, EIM2) linked by a coupling assembly (1), one mobile inertial assembly (EIM1, EIM2) being furnished with first stiffness elements (2, 2') essentially deformable in the plane of the plate along a drive axis x and with second stiffness elements (3, 3') essentially deformable in the plane of the plate along a sense axis y substantially perpendicular to the x axis, the gyrometer comprising, furthermore, for the tuning fork, two first controlled electrodes (4, 4') for electrostatic excitation along the drive axis x which are respectively associated with the two mobile inertial assemblies (EIM1, EIM2), two second controlled electrodes (5, 5') for capacitive detection of the drive resonator along the drive axis x which are respectively associated with the two mobile inertial assemblies (EIM1, EIM2), two third controlled electrodes (6, 6') for capacitive detection of the drive motion along the sense axis y which are respectively associated with the two mobile inertial assemblies (EIM1, EIM2), and:

two fourth controlled electrodes (9, 9') for electrostatic equilibration of the sense resonator along the sense axis y which are respectively associated with the two mobile inertial assemblies (EIM1, EIM2) of the said tuning fork, characterized in that it comprises:

control means (UCE) adapted for applying two respective continuous electrical voltages $V_1$ and $V_2$ to the said two fourth electrodes (9, 9') satisfying the relation $$V_1^2 - V_2^2 = \frac{c_{y\_initial}}{a\lambda},$$

in which $c_{y\_initial}$ represents the initial sensitivity of the gyrometer, when the two electrical voltages $V_1$ and $V_2$ are zero, to linear accelerations along the sense axis y, in deg·h$^{-1}$·G$^{-1}$, a represents a coefficient characterizing the influence of a discrepancy in stiffness between the two branches of the tuning fork on the sensitivity of the gyrometer to linear accelerations along the y axis, in deg·h$^{-1}$·G$^{-1}$·N$^{-1}$·m, $\lambda$ represents an electrostatic stiffness coefficient dependent on the said two fourth electrodes (9, 9') in N·m$^{-1}$·V$^{-2}$, $V_1$ and $V_2$ are expressed in Volts, and G equals 9.81 m·s$^{-2}$.

2. Gyrometer according to claim 1, comprising, furthermore, two fifth controlled electrodes (10, 10') for electrostatic adjustment of the frequency of the sense resonator along the sense axis y which are respectively associated with the two mobile inertial assemblies (EIM1, EIM2) of the said tuning fork, and in which the said control means (UCE) are adapted for applying an electrical voltage $V_f$ to each of the said fifth electrodes (10, 10'), satisfying the relation $$V_f^2 = \frac{(f_{y\_initial} - f_{y\_final}) - \mu(V_1^2 + V_2^2)}{\mu_f},$$

in which:

$f_{y\_initial}$ represents the initial resonant frequency, when the electrical voltages $V_1$, $V_2$ and $V_f$ are zero, of the sense mode along the sense axis y, in Hz, $f_{y\_final}$ represents the desired, final resonant frequency of the sense mode along the sense axis y, to be adjusted, in Hz, $\mu$ represents a sensitivity coefficient dependent on the said fourth electrodes, in Hz·V$^{-2}$, $\mu_f$ represents a coefficient of sensitivity of the frequency of the sense mode to the square of the electrical voltage applied to the said fifth electrodes, in Hz·V$^{-2}$, $V_f$ is expressed in Volts, and $(f_{y\_initial} - f_{y\_final}) - \mu(V_1^2 + V_2^2)$ is positive by dimensioning of the gyrometer.

3. Gyrometer according to claim 2, in which, the said control means controlling the said fifth electrodes (10, 10') in open loop, the said final resonant frequency $f_{y\_final}$ is equal to the frequency $f_x$ of the drive mode along the drive axis x.

4. Gyrometer according to claim 2, in which, the said control means controlling the said fifth electrodes (10, 10') in closed loop, the said final resonant frequency $f_{y\_final}$ is equal to the frequency $f_x$ of the drive mode along the drive axis x.

5. Gyrometer according to claim 2, in which, the said control means controlling the said fifth electrodes (10, 10') in open loop, the said final resonant frequency $f_{y\_final}$ is equal to the sum of the frequency $f_x$ of the drive mode along the drive axis x and of a predetermined frequency discrepancy $\Delta f_y$.

* * * * *